Patented Mar. 24, 1931

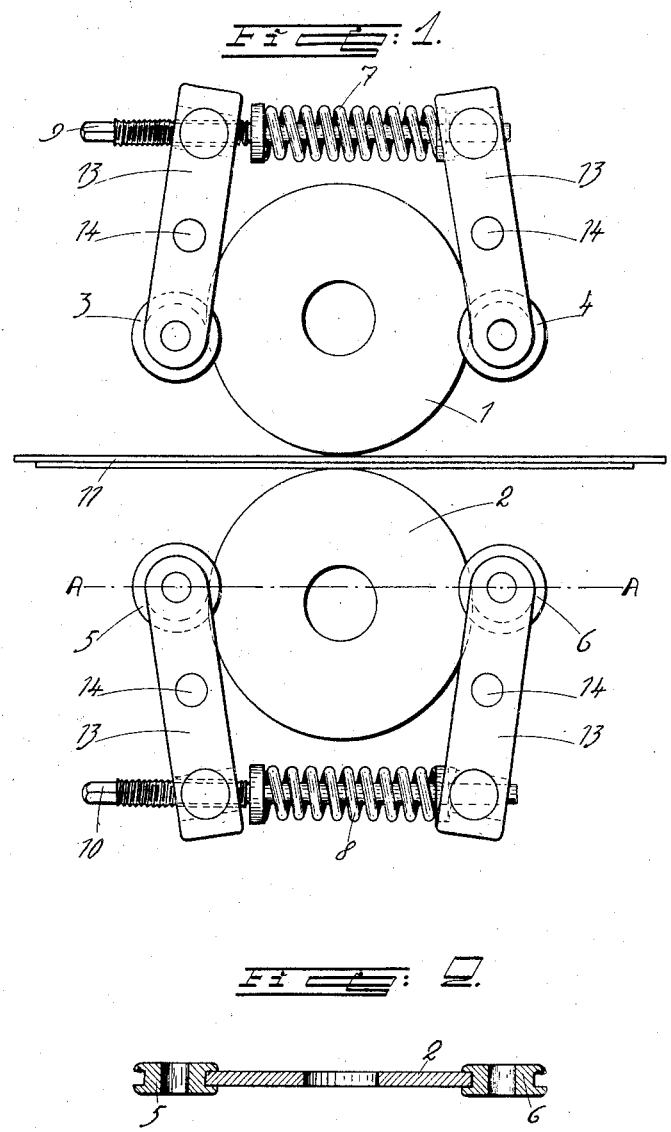

1,797,624

UNITED STATES PATENT OFFICE

CARL GUSTAF LEONARD SJÖLANDER, OF DALSBORG, GOTTENBORG, SWEDEN

ELECTRICAL RESISTANCE WELDING MACHINE

Application filed August 12, 1929, Serial No. 385,301, and in Sweden March 12, 1929.

The subject of the present invention is a device for facilitating and reducing the cost of the drift in electrical resistance welding machines, point and seam welding machines in which rolling electrodes are used.

It is a known fact that the rolling electrodes are subjected to a relatively large wear and upsetting of the parts coming into contact with the piece to be welded, the contact surface between the electrode and the piece to be welded thus changing dimensions with accompanying change of the temperature of the piece to be welded and the character of the weld. The contact surface thus has a tendency to become larger, at which the temperature falls, and the voltage of the electrical current once properly set has to be successively increased causing waste of time and loss of material. After a relatively short time the electrodes have to be returned to their original form which brings with it loss of time and material. If the electrodes kept their form fixed for a certain work these disadvantages would be obviated.

At the present invention one or more circular rollers provided with grooves are employed, which rollers are pressed against the electrodes, and which during the rotation of the latter, roll against the same and in this way hold them in fixed form and thus maintain the contact surfaces at the predetermined dimensions.

Fig. 1 of the accompanying drawing is a view of electrodes, circular rollers and piece to be welded.

Fig. 2 is a section on the line A—A of Fig. 1.

1 and 2 indicate the electrodes and 3, 4, 5 and 6 above mentioned circular rollers. These circular rollers are mounted each in one end of a lever or arm 13 turnable about a shaft-journal 14, and between the other ends of the arms 13 are mounted springs 7, 8 which press said rollers against the electrodes. 9 and 10 indicate screws for straining the springs.

For the purpose of the invention, it is theoretically sufficient to use one roller only to press against the rolling electrode or electrodes, but for practical reasons and to insure a long life to the electrode bearings, it is preferable to use a pair of such rollers pressing against substantially diametrically opposed points of the electrode as shown in the drawing. Thus, radial pressures of the rollers on the electrode, balance each other and furthermore the pressure of each individual roller may be reduced when two are employed. If, on account of the form of the work to be welded, both electrodes cannot be provided with rollers, a great advantage is nevertheless obtained by providing one of said electrodes with such rollers.

I claim:—

1. In an electrical resistance welding machine having a rolling electrode; two peripherally grooved rollers whose grooves receive substantially diametrically opposite portions of the periphery of said electrode, and spring means holding said rollers in engagement with said electrode.

2. In an electrical resistance welding machine having a rolling electrode; two peripherally grooved rollers whose grooves receive substantially diametrically opposite portions of the periphery of said electrode, swingable arms carrying said rollers respectively, and spring means acting on said arms to hold said rollers engaged with the electrode.

3. In an electrical resistance welding machine having a rolling electrode; two peripherally grooved rollers whose grooves receive substantially diametrically opposite portions of the periphery of said electrode, two levers, fulcrumed between their ends, said rollers being carried by one end of said levers, and a compression spring between the other ends of said levers for spreading said other ends, thereby holding the rollers engaged with the electrode.

In witness whereof I have hereunto signed my name.

CARL GUSTAF LEONARD SJÖLANDER.